US011030258B1

United States Patent
Wen et al.

(10) Patent No.: US 11,030,258 B1
(45) Date of Patent: Jun. 8, 2021

(54) RANKING ANOMALIES ASSOCIATED WITH POPULATIONS OF USERS BASED ON RELEVANCE

(71) Applicant: Microsoft Technology Licensing, LLC, Redmond, WA (US)

(72) Inventors: Chih Po Wen, Redwood City, CA (US); Goutham Kurra, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 461 days.

(21) Appl. No.: 15/874,811

(22) Filed: Jan. 18, 2018

Related U.S. Application Data

(60) Provisional application No. 62/447,444, filed on Jan. 18, 2017.

(51) Int. Cl.
  *G06F 16/907* (2019.01)
  *H04L 29/08* (2006.01)
  *G06K 9/62* (2006.01)
  *G06N 20/00* (2019.01)

(52) U.S. Cl.
  CPC ......... *G06F 16/907* (2019.01); *G06K 9/6256* (2013.01); *G06N 20/00* (2019.01); *H04L 67/22* (2013.01); *G06F 2201/80* (2013.01); *G06F 2201/875* (2013.01)

(58) Field of Classification Search
  CPC .......................... G06F 16/9535; G06F 16/355
  See application file for complete search history.

(56) References Cited

U.S. PATENT DOCUMENTS

| | | | |
|---|---|---|---|
| 9,112,895 B1* | 8/2015 | Lin | H04L 63/1416 |
| 10,445,311 B1* | 10/2019 | Saurabh | H04L 63/1425 |
| 10,713,236 B2* | 7/2020 | Averbuch | G06F 17/18 |
| 2006/0075094 A1 | 4/2006 | Wen et al. | |
| 2011/0131122 A1* | 6/2011 | Griffin | G06F 17/18 |

(Continued)

FOREIGN PATENT DOCUMENTS

WO   2017201520 A1   11/2017

OTHER PUBLICATIONS

Lucia et al. ('Active Refinement of Clone Anomaly Reports', 978-1-4673-1067-3/12 2012 IEEE; ICSE 2012, Zurich, Switzerland). (Year: 2012).*

(Continued)

*Primary Examiner* — Ken Hoang
(74) *Attorney, Agent, or Firm* — Schwegman Lundberg & Woessner, P.A.

(57) ABSTRACT

A system analyzes periodically collected data associated with entities, for example, users, servers, or systems. The system determines anomalies associated with populations of entities. The system excludes anomalies from consideration to increase efficiency of execution. The system may rank the anomalies based on relevance scores. The system determines relevance scores based on various factors describing the sets of entities. The system may present information describing the anomalies based on the ranking. The system may use a machine learning based model for predicting likelihoods of outcomes associated with sets of entities. The system generates alerts for reporting the outcomes based on the predictions.

20 Claims, 15 Drawing Sheets

(56) References Cited

U.S. PATENT DOCUMENTS

| | | | |
|---|---|---|---|
| 2016/0147585 A1* | 5/2016 | Konig | G06F 11/3419 |
| | | | 714/37 |
| 2016/0241576 A1* | 8/2016 | Rathod | H04L 63/1425 |
| 2017/0220933 A1 | 8/2017 | Gonguet et al. | |
| 2017/0237760 A1 | 8/2017 | Holeman et al. | |
| 2018/0032724 A1* | 2/2018 | Tang | H04L 41/142 |
| 2018/0083995 A1 | 3/2018 | Sheth et al. | |
| 2019/0102696 A1* | 4/2019 | Guidotti | G06F 40/103 |

OTHER PUBLICATIONS

"Notice of Allowance Issued in U.S. Appl. No. 15/874,810", dated Mar. 25, 2020, 9 Pages.

"Non-Final Office Action Issued in U.S. Appl. No. 15/874,806", dated Mar. 12, 2021, 25 pages.

Buczak et al.; "A Survey Data Mining Machine Learning Methods for Cyber Security Intrusion Detection", In Proceedings of IEEE Communications Surveys and Tutorials, vol. 18, No. 2, Oct. 26, 2015, pp. 1153-1176.

Duffield et al., "Rule-Based Anomaly Detection on IP Flows", In IEEE INFOCOM, Apr. 19, 2009, pp. 424-432. p. 9.

Guertler et al., "Engagement and Nonusage Attrition With a Free Physical Activity Promotion Program: The Case of 10,000 Steps Australia", In Journal of Medical Internet Research, vol. 17, issue. 7, Jul. 2015, pp. 1-14.

Hsu et al., "What Drives Purchase Intention for Paid Mobile Apps?—An Expectation Confirmation Model with Perceived Value", In Elsevier Electronic Commerce Research and Applications, Jan. 2015, pp. 46-57.

Koester et al., "Effect Word Prediction Feature User Performance", In AAC Augmentative Alternative Communication, vol. 12, Issue 3, Sep. 1996, pp. 155-168.

Siris et al., "Application of Anomaly Detection Algorithms for Detecting SYN Flooding Attacks", In Proceedings of IEEE Global Telecommunications Conference, Jan. 17, 2005, pp. 1433-1442.

\* cited by examiner

US 11,030,258 B1

RANKING ANOMALIES ASSOCIATED WITH POPULATIONS OF USERS BASED ON RELEVANCE

CROSS-REFERENCE TO RELATED APPLICATIONS

This application claims the benefit of U.S. Provisional Application No. 62/447,444, filed Jan. 18, 2017, which is hereby incorporated by reference in its entirety.

BACKGROUND

This invention relates in general to analysis of patterns in data describing entities, for example, anomalies in data that is periodically collected by a computing system and more specifically to ranking anomalies associated with populations based on relevance scores.

Systems store information describing certain entities, for example, users, servers, or websites. For example, an online system may be used to collect data describing users, for example user feedback. Systems analyze such data to identify patterns in the data. For example, certain subsets of entities may display certain pattern that distinguishes the subset from other sets of entities. Systems like to identify such patterns and report, for example, as alerts. However, the number of different patterns that is possible can be extremely large. System use techniques, for example, data mining techniques to identify interesting patterns. Conventional techniques for identifying interesting patterns in such data are inefficient since they are required to process a very large amount of data. Such techniques often fail to report interesting patterns or take too long to report interesting patterns.

SUMMARY

An online system stores information describing entities in a database. An entity may represent a user. The online system performs periodic data collection to obtain information from the users. The online system determines anomalies in the data collected, for example, a significant change in values of a collected attribute compared to a previous data collection or a significant difference between an aggregate value based on a collected attribute and a benchmark. The online system determines relevance scores for anomalies and ranks them using the relevance scores. The online system may use the ranking to determine a subset of the anomalies for presenting via a user interface. The online system may generate alerts based on the anomalies.

The online system determines relevance score for an anomaly based on various factors, for example, a category associated with the anomaly indicating whether the alert is about good information associated with the population or bad information, the size of the population associated with the anomaly, whether the anomaly is about a particular team, whether the anomaly is associated with the overall response rate of users, a measure of correlation between an attribute associated with the anomaly and another attribute predetermined to represent an outcome, a measure of impact of the attribute associated with the anomaly, and so on.

In an embodiment, an anomaly is associated with a collected attribute and the factors used for determining the relevance score for the anomaly comprise a difference between an aggregate value of the collected attribute and a baseline value of the collected attribute. The baseline value of the collected attribute may represent a benchmark or a previous aggregate value based on the collected attribute values obtained during a previous data collection.

In an embodiment, a first anomaly associated with a first set of records is ranked higher than a second anomaly associated with a second set or records if the size of the first set or records is greater than the size of the second set or records. In an embodiment, a first anomaly associated with a first set of records is ranked higher than a second anomaly if the first anomaly is indicative of negative information associated with entities associated with the first set of records and the second anomaly is indicative of a positive information associated with the entities associated with the second set of records. In an embodiment, a first anomaly associated with a first collected attribute is ranked higher than a second anomaly associated with a second collected attribute if the first collected attribute is determined to have higher correlation with the outcome attribute compared to the second collected attribute. In an embodiment, each anomaly is associated with a set of users representing a population and a first anomaly associated with a first population is ranked higher than an a second anomaly associated with a second population if the first population is determined to be a team having a supervisor and wherein each member of the team reports to the supervisor. In an embodiment, an anomaly based on an overall response rate associated with a data collection is ranked higher than an anomaly representing difference between values of a specific collected attribute and a baseline associated with the collected attribute.

Although embodiments describe generation of alerts related to users, the techniques described herein are applicable to other entities, for example, servers, websites, objects, and so on. For example, the online system may periodically collect data describing a set of servers and analyze various subsets of the servers to generate alerts describing certain subsets of servers. Similarly, the online system may periodically collect data describing a set of websites and analyze various subsets of the websites to generate alerts describing certain subsets of websites.

The features and advantages described here and the following detailed description are not all-inclusive. Many additional features and advantages will be apparent to one of ordinary skill in the art in view of the drawings, specification, and claims hereof.

BRIEF DESCRIPTION OF THE DRAWINGS

Figure (FIG. 1 is a diagram of a system environment for creating alerts based on user responses, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
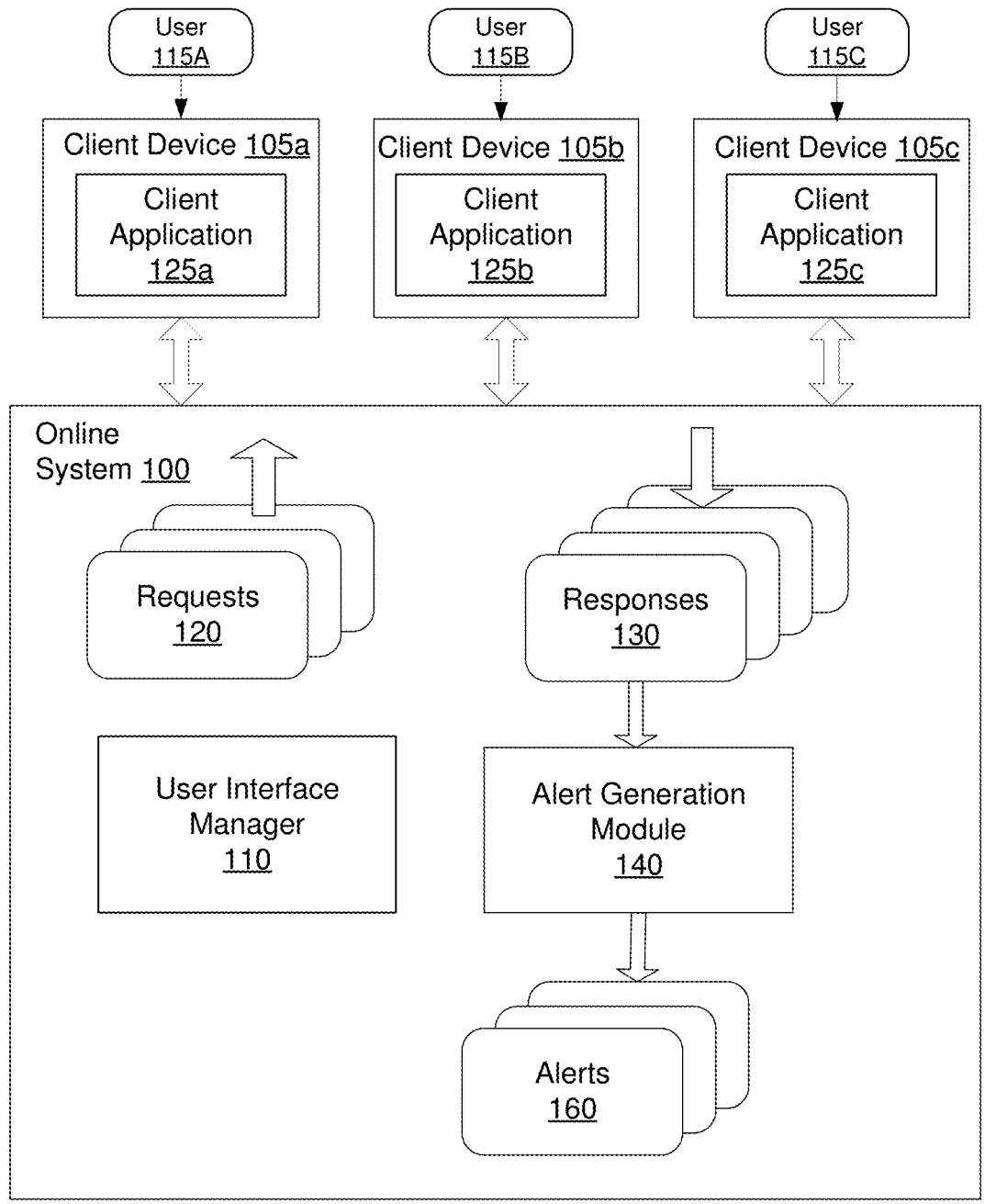

FIG. 1 is a diagram of a system environment for analyzing alerts or anomalies based on data collected from users, in accordance with an embodiment of the invention. The users 115 interact with the online system 100 using client devices 105. Some embodiments of the online system 100 and client devices 105 have different and/or other modules than the ones described herein, and the functions can be distributed among the modules in a different manner than described here.

The online system 100 comprises a user interface manager 110, an alert generation module 140, and a user interface manager 110. The online system 100 may include other modules than those shown in FIG. 1, for example, modules shown in FIG. 2. FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

The user interface manager 110 is configured to present user interfaces via client devices 105. The user interface manager 110 presents user interfaces with questions or request 120 and allows user to provide responses 130 comprising answers to the questions. The online system 100 may be associated with an organization, for example, a company, an enterprise, a social group, and the like. Accordingly, users of the online system may be members of the organization. In an embodiment, the user interface manager 110 presents surveys comprising questions to users requesting information from the users in the form of responses to the questions.

The client device 105 used by a user 115 for interacting with the online system 100 can be a personal computer (PC), a desktop computer, a laptop computer, a notebook, a tablet PC executing an operating system, for example, a Microsoft Windows®-compatible operating system (OS), Apple OS X®, and/or a Linux distribution. In another embodiment, the client device 105 can be any device having computer functionality, such as a personal digital assistant (PDA), mobile telephone, smartphone, wearable device, etc.

The client device 105 executes a client application 125 that allows users to interact with the online system 100. For example, the client application 125 executing on the client device 105 may be an internet browser that interacts with the online system using the hypertext transfer protocol (HTTP) and receives markup documents, for example, documents of hypertext markup language (HTML) provided by the user interface manager 110 of the online system. The internet browser of the client device 105 renders user interfaces configured by the user interface manager 110 using the markup language document. In other embodiments, the client application 125 is a proprietary application used by the enterprise associated with the online system that interacts with the online system 100 using a proprietary protocol.

The client application 125 presents a user interface to allow the user 115 to interact with the online system 100. The user interface allows the user to perform various actions associated with the online system 100 and view information provided by the online system 100. In an embodiment, the online system 100 configures a user interface for presenting to the user 115 via the client application 125. The user interface presents one or more widgets that allow a user to enter responses to questions, for example, a text box. The responses provided by users include feedback in the form of ratings and text, comments, and so on.

The online system 100 performs data collection by presenting users with questions and receiving answers to the questions. The online system 100 stores the data collected in the form of answers received as collected attributes. For example, a collected attribute may indicate a rating provided by a user to certain action taken by the organization. Another collected attribute may represent a level of satisfaction of the user. Another collected attribute may represent information describing a particular aspect of the work environment of the organization, for example, availability of resources to perform certain action.

The alert generation module 140 analyzes responses 130 received during a data collection to identify anomalies representing information describing various populations. The information describing the populations is represented as alerts 160 which may be presented to a user, for example, an expert via a client application 125. Examples of alert included a significant decrease in a level of satisfaction of users belonging to a particular population, an increase in attrition rate indicating a likelihood that users of a particular population may quit the organization, and so on. The total number of populations that can be analyzed can be extremely large. Each population may correspond to a combination of values of attributes describing the users. Examples of attributes include age, gender, qualification, type of job, salary of an employee, a rate at which the user interacts with other users of an organization, the hours during which a user works in the organization, the number of vacations taken by an employee, the number of users in the department that the user belongs to, and so on. The number of populations may be exponential in the number of attributes describing the users. As a result, determination of anomalies associated with specific populations is a highly computation intensive task. Embodiments of the invention perform efficient computation of the anomalies so that interesting patterns can be determined within reasonable time and using reasonable amount of resources.

The interactions between the client devices 105 and the online system 100 are typically performed via a network, for example, via the Internet. The network enables communications between the client device 105 and the online system 100. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network can also include links to other networks such as the Internet.

System Architecture

Figure 2A:
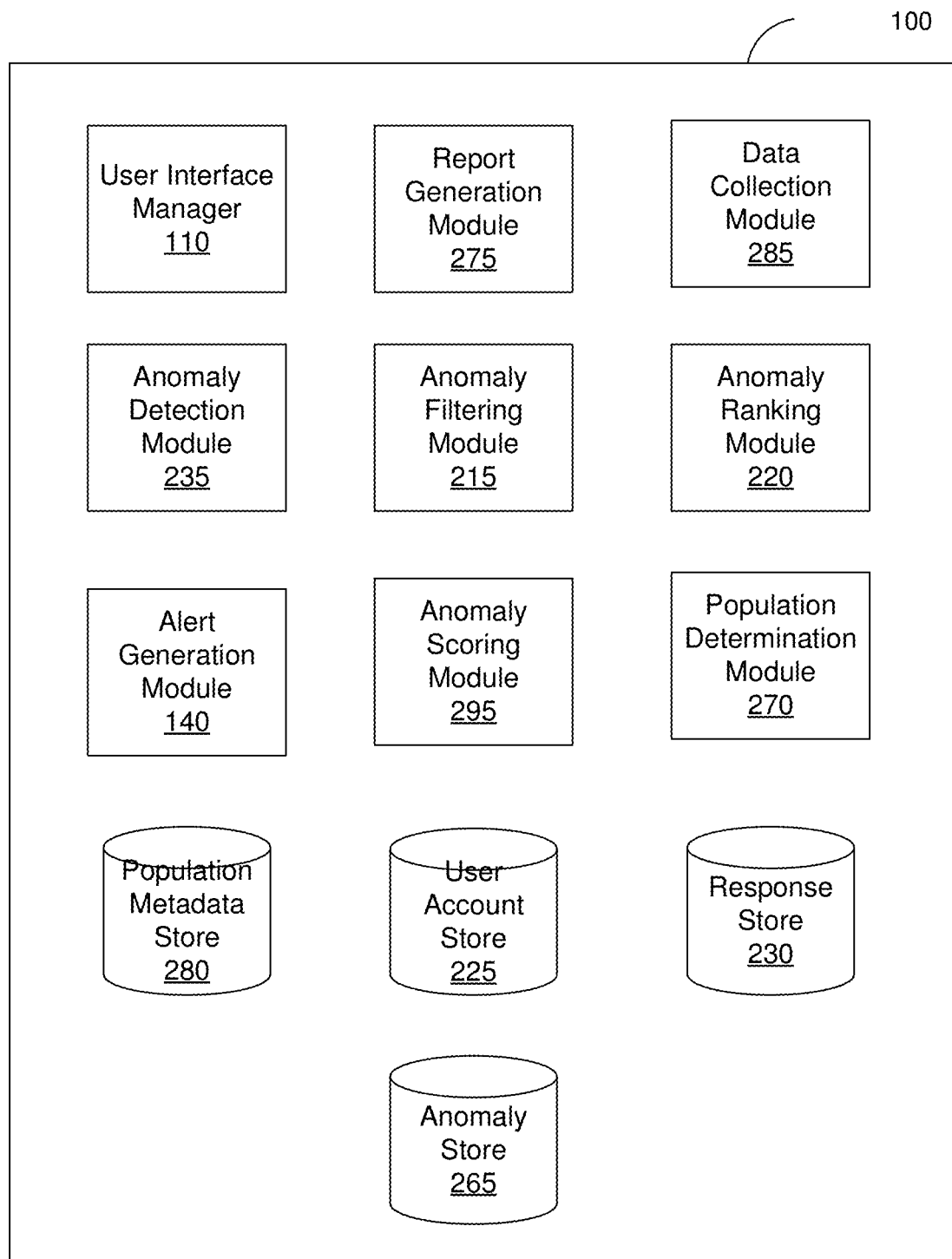
FIG. 2A is a diagram of system architecture of an online system for generating alerts based on user responses, in accordance with an embodiment of the invention.

FIG. 2A is a diagram of system architecture of an online system for generating alerts based on user responses, in accordance with an embodiment of the invention. The online system 100 includes user interface manager 110, a user account store 225, anomaly filtering module 215, anomaly ranking module 220, anomaly detection module 235, alert generation module 140, response store 230, anomaly store 265, anomaly scoring module 295, and population determination module 270. In other embodiments, the online system 100 may include additional, fewer, or different modules for various applications. Conventional components such as network interfaces, security mechanisms, load balancers, failover servers, management and network operations consoles, and the like are not shown so as to not obscure the details of the system. Actions indicated as being performed by a particular module may be performed by other modules.

The user account store 225 stores information describing users. The users may be users of the online system 100 and/or may be associated with an organization. The user account store 225 includes a unique identifier for each user. The user account store 225 may include credentials for each user to verify authenticity of sessions created by the users. For an online system 100 associated with an organization, the user account store 225 may include information describing a role of the user, a department associated with the user, one or more teams associated with the user within the organization, a location of the user associated with the organization, and so on. The user account store 225 may include the relation between the user and other users in the organization, for example, one or more managers of the user and if applicable, other users reporting to the user.

In other embodiments of online systems 100, the user account store 225 may include biographic, demographic, and other types of descriptive information, such as age, work experience, educational history, interests, gender, hobbies or preferences, location, income, languages spoken, ethnic background, and the like.

The population determination module 270 determines various populations based on a given set of users or entities. A population refers to a set of entities or users. Each entity or user may be represented using a record stored in a database of the online system 100. For example, if the online system is associated with users of an organization, an entity corresponds to a user or member of the organization. An organization may be a group of users, for example, a company or an employer that is associated with various employees.

The population determination module 270 identifies a population by specifying values for various attributes used to describe the users (or entities) as stored in the user account store 225. For example, a population may represent all members that have male gender, another population may represent members with male gender that are within age group 25-40, another population may represent members with male gender that are within age group 26-40, another population may represent members with male gender that are within age group 27-40, and so on. The number of different populations that are possible can be very large since the number of possible combination of values of each attribute can be very large. The number of different populations is an exponential function of the number of different attributes used to represent each user (or entity) and the number of distinct values possible for each attribute. The population determination module 270 stores the description of various populations identified in the population metadata store 280. Each population may be described using metadata that identifies one or more attributes and possible values of the identified attributes.

The population metadata store 280 stores metadata defining various teams. The population metadata store 280 stores metadata describing each team, for example, a team of sales personnel, a team of managers, a team of developers, a team of members performing testing, a team of operators, a team of technicians, a team of customer support personnel and so on. The population metadata store 280 or the user account store 225 may store associations between teams and users that are members of an organization. In an embodiment, the population determination module 270 identifies a team of users as all users that report to the same manager or supervisor as indicated by a hierarchy of the organization. The hierarchy of the organization may be determined by analyzing a supervisor attribute of each employer and forming a hierarchical tree or a forest data structure.

In an embodiment, the population determination module 270 determines whether a population corresponds to a team by analyzing the filter defining the population. For example, if the filter represents a subset of users obtained by limiting an attribute defining the team to a name of a team, the population determination module 270 determines that the population corresponds to a team or a subset of the team. The population determination module 270 stores metadata indicating whether a population corresponds to a team or a subset of the team in the population metadata store 280. In another embodiment, the population determination module 270 may determine that a population corresponds to a team by matching the set of users corresponding to the team with the set of users corresponding to the population. The population determination module 270 determines that the population corresponds to the team if the two sets are determined to have an overlap that is more than a significant threshold value, for example, there is more than 95% overlap compared to the population itself and/or the team itself. In an embodiment, if the population determination module 270 cannot associate a team with a population, the population determination module 270 stores a flag in the population metadata store 280 indicating that the population could not be associated with a team.

The data collection module 285 collects data associated with entities represented by records stored in the online system. For example, if the entities represented by the records are users or members of an organization, the data collection module 285 collects data from the users. In an embodiment, the online system 100 sends questions to users and receives responses to the questions from users. In some embodiments, the online system 100 receives responses to surveys presented to the user requesting the user to provide information. The data collection module 285 may collect data periodically, for example, every week or every month. Alternatively, the data collection module 285 collects data responsive to receiving a request from a user, for example, a system administrator.

The response store 230 stores information describing responses received by the online system 100. The response store 230 may store the content of the response using a representation of text data. In some embodiments, the online system 100 receives responses as a media object, for example, in an audio or video form. In these embodiments, the online system 100 transcribes the audio from the media object to generate a textual representation of the response.

The user interface manager 110 presents the user with a survey comprising one or more questions requesting answers from the user. The survey also allows a user to provide information that is not associated with specific questions, for example, by allowing the user to enter a response as text about the organization or a specific event or any particular issue. The online system 100 tracks whether a response was provided in response to a particular question. Accordingly, the response store 230 stores information associating a response with a question. The response store 230 may store information associating the response with a particular survey and a question within the survey.

The anomaly detection module 235 analyzes the data collected by the data collection module 285 to detect anomalies associated with sets or records associated with entities. In an embodiment, the entities represent users and the anomalies are associated with populations, each population representing a set of users, for example, a set of users of an organization. In an embodiment, the anomaly detection module 235 determines an anomaly by determining certain aggregate values based on responses received from users. The anomaly detection module 235 determines that an anomaly exists for a population if an aggregate value based on data collected form users of that population differs from a corresponding benchmark value by more than a predetermined threshold value. The anomaly detection module 235 may determine an anomaly based on specific attributes representing data collected, for example, responses indicating employee satisfaction in a company or organization.

The anomaly detection module 235 may use various types of benchmarks. In an embodiment, the anomaly detection module 235 uses benchmarks that are received by the online system 100, for example, from an expert or from an external system. The benchmark may represent an industry standard value of a particular metric. The benchmark may represent an value of a particular metric determined for a set of organizations, for example, all organizations in a particular region or location, all organizations associated with a particular type of industry, all organizations having a particular size as determined by number of users of the organization or by revenue or profitability of the organization. In an embodiment, the online system 100 determines the benchmark values based on various organizations associated with the online system 100. For example, various organizations using the online system 100 may provide results of their data collection to the online system 100, thereby allowing the online system 100 to calculate a benchmark value.

In an embodiment, the benchmark represents a corresponding aggregate value determined to data collected previously by the data collection module 285. For example, the anomaly detection module 235 may detect an anomaly if an aggregate value based on data collected for a particular month exceeds more than a threshold value compared to the previous month. As another example, the anomaly detection module 235 may detect an anomaly if an aggregate value based on data collected for a particular month exceeds more than a threshold value compared to a moving average based on various data collections.

In another embodiment, the anomaly detection module 235 uses a benchmark representing the corresponding aggregate value based on data collected for another population. For example, the anomaly detection module 235 may detect an anomaly if an aggregate value based on data collected for a particular population differs by more than a threshold compared to the corresponding aggregate value for a larger population that is a superset of the particular population. For example, the anomaly detection module 235 may detect an anomaly if an aggregate value for a team differs by more than a threshold compared to the aggregate value for the entire organization or for a department of the organization if the team belongs to that department.

The anomaly detection module 235 stores the detected anomalies in anomaly store 265. The anomaly store 265 may store various attributes describing an anomaly. An example of an attribute describing an anomaly is a time period associated with the anomaly indicating when the anomaly occurred, for example, the data collection period based on which the anomaly was detected. The anomaly store 265 stores an association between the anomaly and a population (or a set of records associated with entities) for which the anomaly was detected. In an embodiment, the information describing an anomaly refers to a record stored in the population metadata store 280 describing a population for which the anomaly was observed.

The anomaly store 265 may store a type for the anomaly, the type indicating how the anomaly was computed, for example, whether the anomaly was computed based on an industry benchmark, statistics based on another population, or a previous time interval. The anomaly type may indicate the type of information indicated by the anomaly, for example, a particular type of anomaly may indicate an increase in an aggregate value of a particular attribute collected compared to a past time interval, another anomaly type may indicate a low aggregate value of another type of collected attribute compared to a benchmark value, and so on. The anomaly store 265 also stores any data associated with the anomaly calculation, for example, the details of a benchmark used for determining the anomaly, or the details of the previous time interval used for determining the anomaly, or the details of another population used for determining the anomaly.

The anomaly detection module 235 may identify multiple anomalies for a given population. Since the total number of populations that can be identified is a very large number, the anomaly filtering module 215 eliminates certain anomalies from processing. This allows the online system 100 to reduce the number of anomalies that are processed, thereby increasing the efficiency of generating alerts associated with anomalies.

The anomaly ranking module 220 determines a relevance score for each anomaly. The relevance score allows the anomaly ranking module 220 to rank various anomalies based on their relevance, thereby allowing selection of anomalies that are more relevant to a viewer. The online system 100 generates alerts based on the top ranking anomalies.

The anomaly scoring module 295 determines the relevance score for an anomaly based on various factors associated with the anomaly. Various factors considered for determining a score associated with an anomaly are further described herein. The anomaly scoring module 295 provides the scores of the anomalies to other modules, for example, to anomaly ranking module 220 for ranking anomalies.

In an embodiment, one or more of the stores of the online system 100, for example, the user account store 225, the anomaly store 265, the population metadata store 280, or the response store 230 are implemented using relational databases. For example, the user account store 225 may comprise one or more database tables storing user attributes as columns of the database tables. Similarly, a response store 230 may store response and attributes of response using one or more database tables. In an embodiment, the database tables storing responses refer to user accounts in the database tables storing user accounts, for example, using foreign key relationships. Accordingly, the database associates each response with one or more users, for example, the user who provided the response. The database may receive queries that join the response information with the user information to generate reports that describe users associated with the responses.

The user interface manager 110 as described in relation to FIG. 1 configures user interfaces for allowing users to interact with the online system 100. In an embodiment, the user interface manager 110 generates markup language documents, for example, HTML documents and sends for display via a client application executing on a client device 105. The user interface manager 110 configures markup language documents that include various widgets, for example, widgets for presenting questions represented as text to a user and widgets for receiving responses as text inputs.

The report generation module 275 generates reports for display via the client device 105. In an embodiment, the report generation module 275 stores database queries corresponding to each report. The database queries process data stored in the various data stores of the online system 100. The report generation module 140 further allows users to modify existing queries or enter new queries to generate new reports. For example, the report generation module 275 may present results of executing a particular report and allows the user to specify filters to modify the result, to select specific columns of the report to display, or to specify a type of visualization used for presenting the results. The user interface manager renders for display, reports generated by the report generation module 275.

The alert generation module 140 generates alerts based on various types of information including anomalies associated with populations. In an embodiment, the alert generation module 140 uses machine learning techniques to determine values of certain metrics that are used for generating alerts. The metrics may describe certain attributes of populations (or sets of entities associated with records stored in the online system 100). For example, a metric may define a predicted attrition rate for a population indicating a likelihood of members of the population leaving the organization.

Figure 2B:
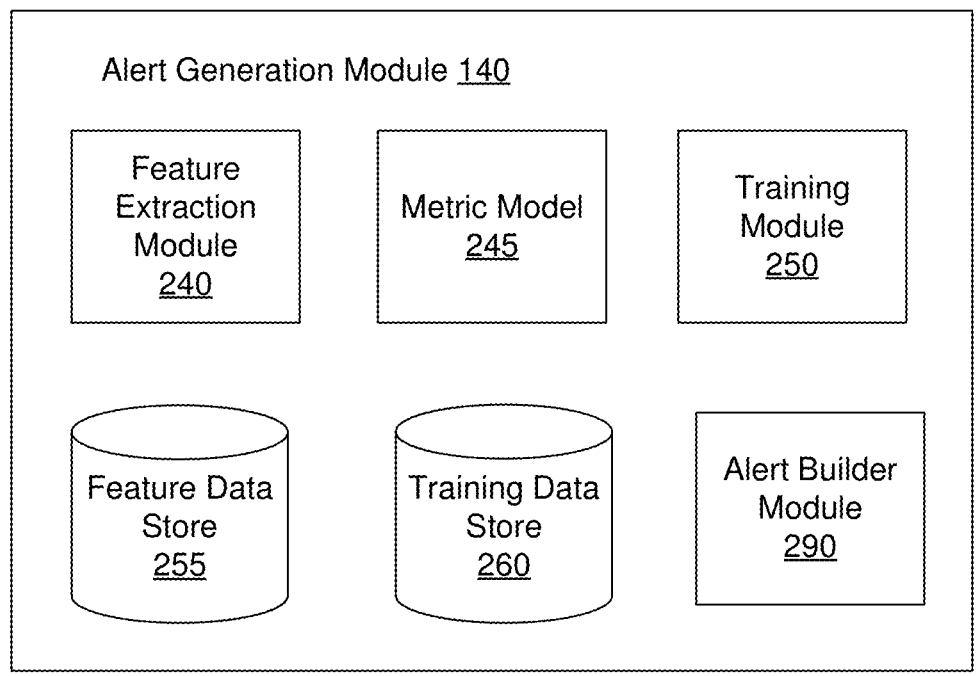
FIG. 2B is a diagram of system architecture of the alert generation module of the online system, in accordance with an embodiment of the invention.

FIG. 2B is a diagram of system architecture of the alert generation module of the online system, in accordance with an embodiment of the invention. The alert generation module 140 comprises a feature extraction module 240, a training module 250, a training data store 260, a metric model 245, an alert builder module 290, and a feature data store 255. In other embodiments, the alert generation module 140 may include additional, fewer, or different modules for various applications. Actions indicated as being performed by a particular module may be performed by other modules.

The metric model 245 is a machine learning based model that predicts values of a metric describing a population based on input describing the population and data collected by the data collection module 285. An example of a machine learning model used by the alert generation module 140 is the metric model 245 that determines a value of a particular metric based on various input features based on user attributes and collected data. Embodiments may use various machine learning techniques, for example, support vector machine tree-based models, kernel methods, neural networks, splines, or an ensemble of one or more of these techniques.

The training data store 260 stores training data for training a metric model 245. The training module 250 trains the metric model 245 using the training data stored in training data store 260. The feature extraction module 240 extracts features from data collected by the data collection module 285 for providing as input to a metric model 245. In an embodiment, the extracted feature vector comprises information describing one or more anomalies, each anomaly associated with a set of records, for example, a set of records storing information describing a population. Examples of anomalies used in a feature vector include, an anomaly indicating that an aggregate value based on a collected attribute exceeds a benchmark value by more than a threshold value, or an aggregate value based on a collected attribute for a population exceeds a previous aggregate value based on the collected attribute values for that population obtained during a previous data collection. The feature extraction module 240 stores the extracted features in the feature data store 255. Further details of various modules within the alert generation module 140 are described herein in conjunction with various flowcharts.

In one embodiment, the training data store 260 also includes data sets other than those discussed above, such as a verification data set. The verification data set also includes input and output data. The trained model may be fed the input data of the verification data set to see if it is able to generate output that matches or has a threshold measure of similarity to the output data of the verification data. This may be used to ensure that the model has not been over fitted to the training data.

The alert builder module 290 configures alerts for presentation via a user interface. The alert builder module 290 may configure messages for sending to users based on metrics generated by the metric model 245. The alert builder module 290 may configure widgets for visualizing one or more metrics generated by the metric model 245 for displaying via a graphical user interface.

In some embodiments, the system 100 is not an online system but a system that communicates with an online system to obtain the necessary user information. The system 100 may communicate with the online system, for example, using APIs provided by the online system. In these embodiments, some modules shown in FIGS. 1 and 4 may run in the system 100, whereas other modules may run in the remote online system. In other embodiments, the processes described herein are executed by any system, for example, an offline system that receives data collected by another system and analyzes it.

Overall Process

FIG. 3-9 show various processes associated with generating alerts based on populations, in accordance with various embodiments of the invention. The steps described herein for each process may be executed by modules other than those indicated herein. Furthermore, the steps may be executed in an order different from that indicated in the figures. For example, some steps may be performed in parallel or concurrently.

Figure 3:
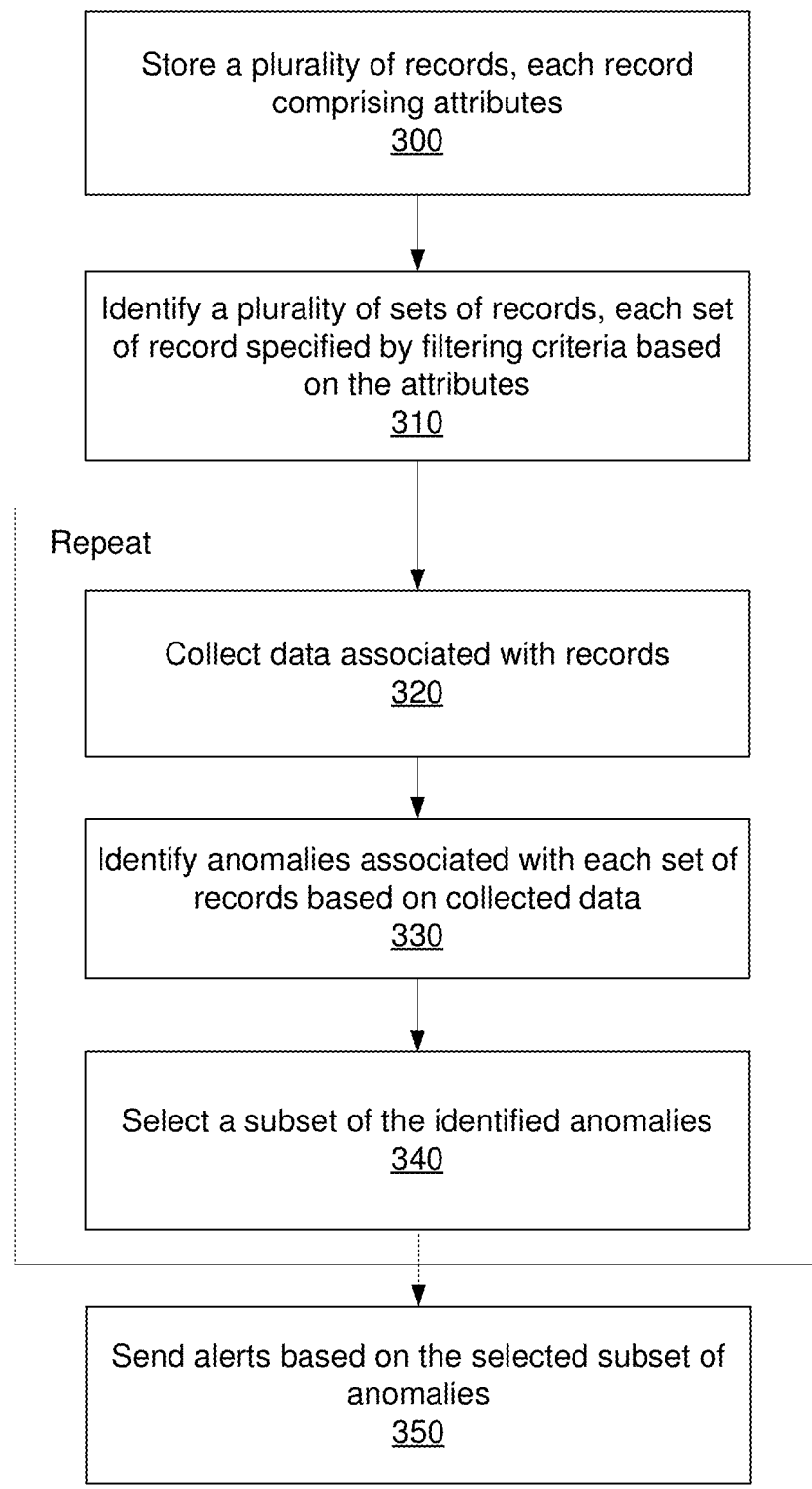
FIG. 3 shows a flowchart illustrating a process for generating alerts based on user responses, in accordance with an embodiment of the invention.

FIG. 3 shows a flowchart illustrating a process for generating alerts based on user responses, in accordance with an embodiment of the invention. The online system 100 stores a plurality of records. Each record is associated with an entity, for example, a user, a server, a website, and so on. Each record includes attributes describing the entity associated with the record.

The online system 100 identifies a plurality of sets of records. The online system 100 specifies a set of record using filtering criteria based on values of one or more attributes. For example, if X represents an attribute of the entities stored as records, the filtering criteria may specify a set of values of X or a range of values of X. Accordingly, all entities that have a value of attribute X that satisfies the filtering criteria are includes in the specified set. The filtering criteria may specify multiple attributes. The online system 100 may identify large number of sets of records since the number of combinations of values of various attributes can be very large.

The online system 100 may perform the following steps (320, 330, and 340) repeatedly. Various operations (320, 330, and 340) may be repeated at different frequencies. The online system repeatedly collects data associated with various records. The data collected may be obtained from a user associated with the record, for example, if the entity represented by the record is a user or if the entity is associated with a user. Alternatively, the data may be collected automatically, for example, if an entity represents a system or a website, the data may be collected by executing an application programming interface (API) of the system or website.

The online system 100 identifies 330 anomalies associated with each set of records based on the collected data. The online system 100 may identify an anomaly by comparing the collected data across various points in time and determining that an anomaly exists of an aggregate value based on the data collected changes by more than a threshold value or percentage across two data collections. The online system 100 may identify an anomaly by comparing the collected data with a benchmark and determining that an anomaly exists of an aggregate value based on the data collected exceeds a benchmark by more than a threshold value.

The online system 100 selects 340 a subset of the anomalies identified 330. The online system 100 may select a subset of anomalies by eliminating one or more anomalies based on certain predetermined criteria. In an embodiment, the online system 100 ranks the anomalies based on certain relevance score determined for each anomaly and selects the top ranking anomalies.

The online system 100 sends 350 alerts based on the selected anomalies. In an embodiment, the online system 100 presents information describing the anomalies via a user interface. In another embodiment, the online system 100 generates one or more metrics associated with sets of records based on the anomalies and presents information describing the metrics via a user interface. In an embodiment, the online system 100 sends 350 alerts as messages, for example, via electronic mail.

Figure 4:
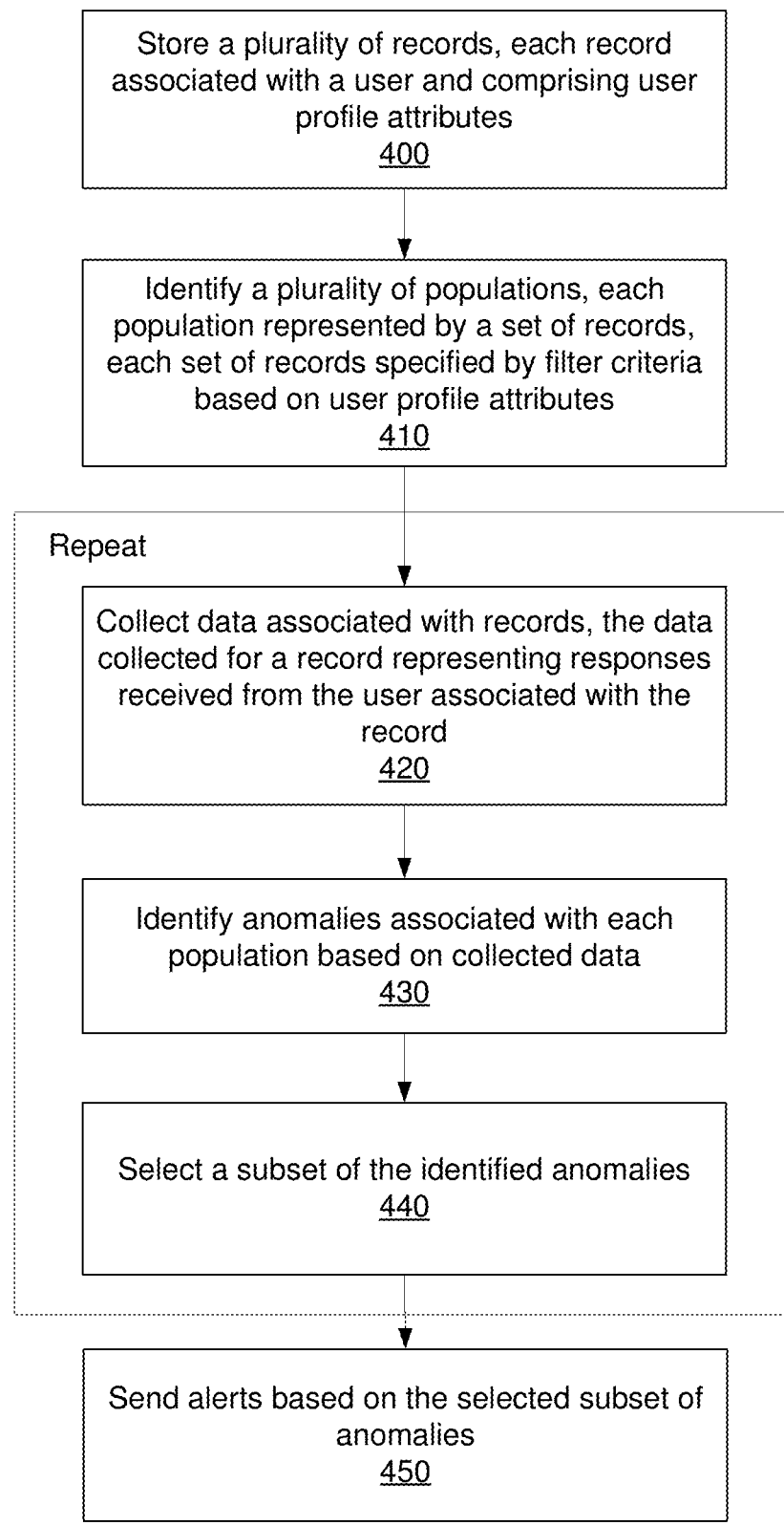
FIG. 4 shows a flowchart illustrating a process for generating alerts associated with populations based on user responses, in accordance with an embodiment of the invention.

FIG. 4 shows a flowchart illustrating a process for generating alerts associated with populations based on user responses, in accordance with an embodiment of the invention. Various steps described in FIG. 4 can be generalized to process alerts based on other types of entities as described in connection with the process illustrated in FIG. 3.

The user account store 225 of the online system 100 stores 400 a plurality of records, each record associated with a user. For example, the user account store 225 may store records representing members of an organization such that each record stores information describing a member of the organization. As another example, the user account store 225 may store records representing employees of a company such that each record stores information describing a or an employee of a company. Each record stores attributes describing a user, for example, first name, last name, age, gender, status in an organization or company, salary earned by the user, a team within the organization such that the user is a member of the team, and so on.

The population determination module 270 identifies a plurality of populations. For example, the plurality of users may represent all members of an organization, and each population may represent a subset of members of the organization. The data collection module 285 collects 420 data associated with the users. The data collection module 285 may collect 420 data periodically, for example, once a week or once a month, or at various intervals as determined by a system administrator. In an embodiment, the data collection module 285 collects 420 data by presenting a user with requests (or questions) via a user interface and receiving responses (or answers) from the user. The questions may be provided as a survey presented to users, for example, members of the organization.

The steps 430, 440, and 450 shown in the flowchart shown in FIG. 4 correspond to the steps 330, 340, and 350 of the flowchart shown in FIG. 3. Accordingly, the anomaly detection module 235 identifies anomalies associated with each population based on the collected data. The anomaly filtering module 215 and/or anomaly ranking module 220 select 440 a subset of the identified anomalies. The alert generation module 140 generates and sends 450 alerts based on the selected subset of anomalies.

Machine Learning Based Metric Determination for Alerts

Figure 5:
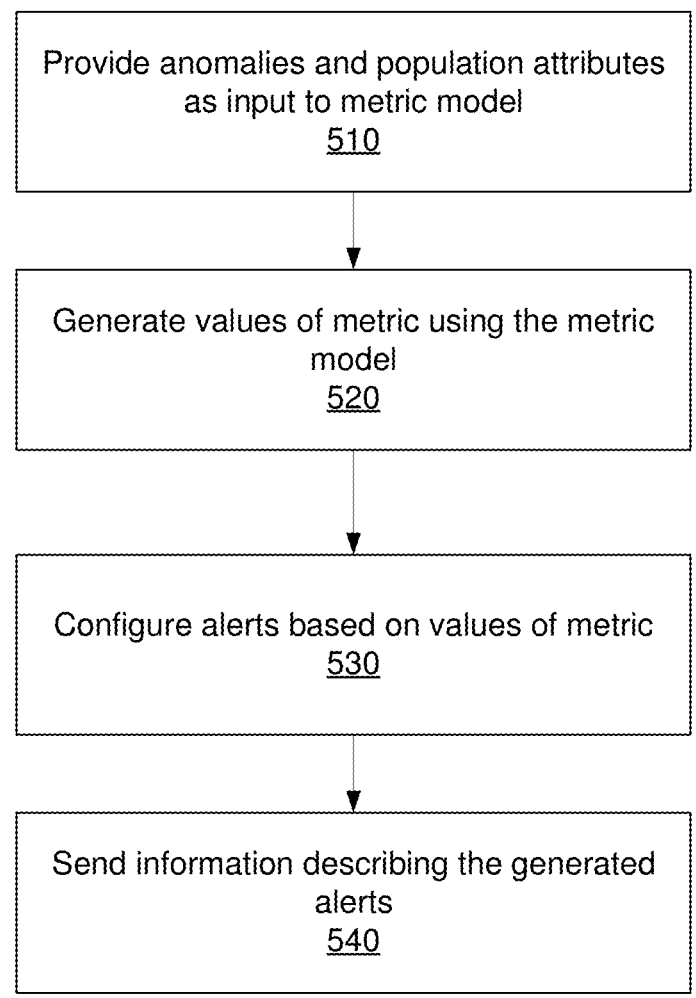
FIG. 5 shows a flowchart illustrating a process for generating alerts based on a machine learning model, in accordance with an embodiment of the invention.

FIG. 5 shows a flowchart illustrating a process for generating alerts based on a machine learning model, in accordance with an embodiment of the invention. The alert generation module 140 provides 510 various inputs to the metric model 245 including attributes of a population and anomalies associated with that population. The metric model 245 is trained to generate values of a particular metric and accordingly generates 520 values of that metric. In an embodiment, the metric describes a likelihood of an outcome associated with a population. An outcome represents a particular result indicative of a particular action taken by users of an organization, for example, whether a user is planning on leaving the organization or whether the user is not satisfied as a result of particular decision taken by the organization. For example, the outcome may represent an action taken by one or more users from the population.

The alert builder module 290 configures one or more alerts based on the generated metric values. For example, the alert builder module 290 may configure a message describing the metrics for sending to an administrator. Alternatively the alert builder module 290 may render a chart or a visual representation of the metric values for presentation to a user. The alert builder module 290 provides information describing the alerts to the user interface manager 110 for presenting to a user 115 via a client application 125 executing on a client device 105.

Figure 6:
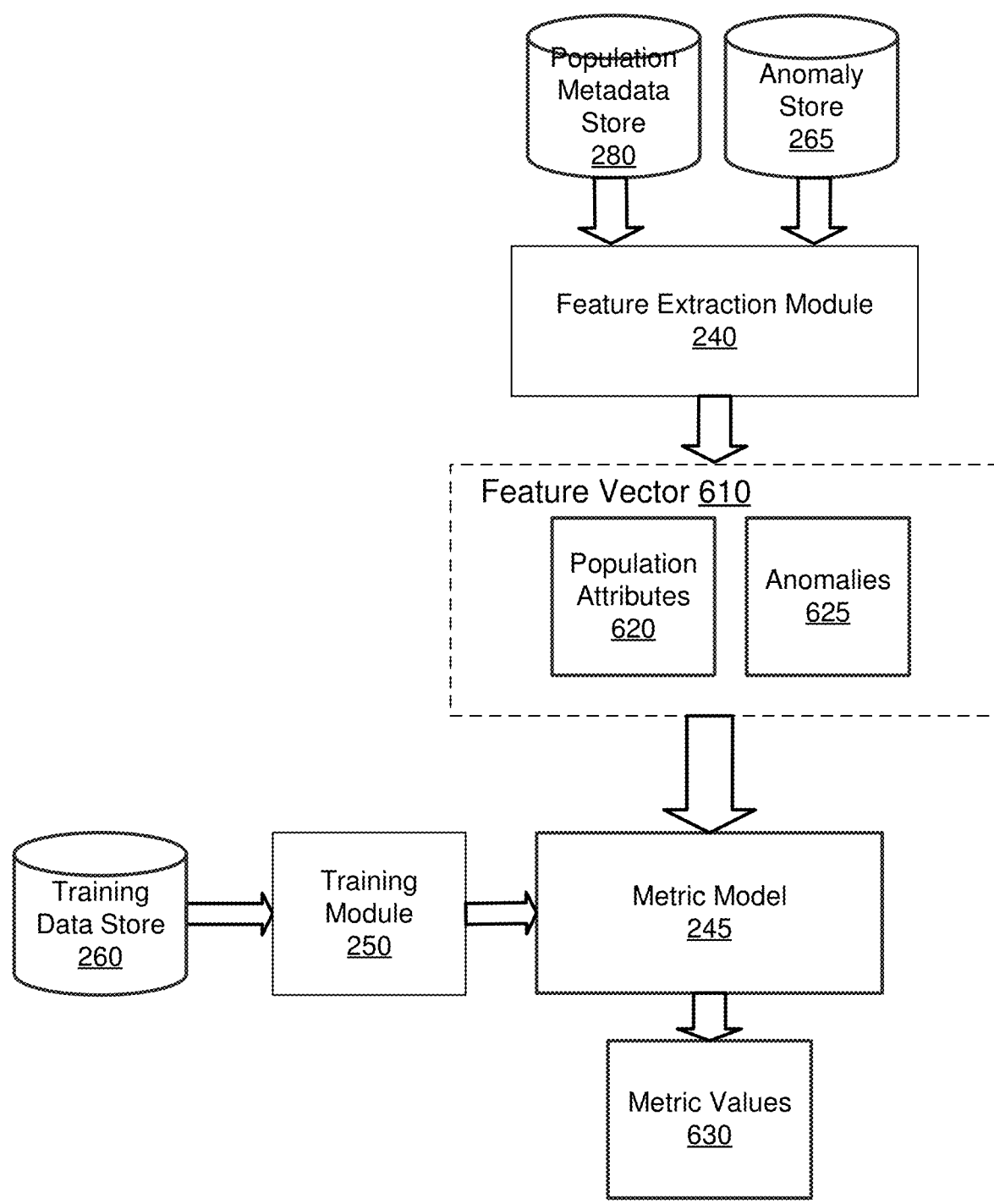
FIG. 6 shows the process of training and using a machine learning model for generating alerts, in accordance with an embodiment of the invention.

FIG. 6 shows the process of training and using a machine learning model for generating alerts, in accordance with an embodiment of the invention. The training module 250 trains the metric model 245 using training data sets stored in the training data store 260. The training data stored in the training data store 260 includes training input data and expected output data. The training input data includes a training set of collected data and user profile attributes. The training data further includes an output or answer set of data indicating a metric value for given inputs. The training set of metric values may be provided by users, for example, domain experts. Accordingly, the output of the metric model 245 for the training set is known a priori.

The training module 250 trains the metric model 245 using feature vectors extracted by the feature extraction module 240 from the training data set stored in training data store 260. In one embodiment, the training module 250 feeds the feature data extracted from information describing a population and data collected from users of that population along with the desired output data to train the metric model 245 using machine learning training techniques, such as supervised learning. In an embodiment, the metric model 245 generates a metric associated with an outcome representing one or more users of a population taking a particular action. For example, the metric represents a likelihood of one or more users of the population taking the particular action. In an embodiment, the metric represents a predicted attrition rate of users of the population. In an embodiment, the metric represents a predicted measure of satisfaction of users of the population. In an embodiment, the metric represents a likelihood that the aggregate measure of satisfaction of users of the population during a future time interval is above a threshold value. In an embodiment, the metric represents a predicted level of performance of users of the population. In an embodiment, the metric represents a likelihood that the expected level of performance of users of the population for a future time interval is above a threshold value.

In one embodiment, the metric model 245 provides a coefficient (or a weight) for each type of feature that may be received as input by the metric model 245. Each feature is assigned a value or converted into a value and modified by the coefficient. The resulting values are combined together (e.g., by a weighted aggregation or summation) resulting in generation of a metric value. Using a training technique, the coefficients of these features are modified across the entire feature data input set and so that the generated metric value matches the output data of the training set. Initially, a default coefficient may be applied to each feature. Once the model is trained by the training module 250, the training module 250 may further verify the accuracy of the model using a separate verification data set that includes both feature data and output data.

Once the metric model 245 is trained (and validated), the metric model 245 generates metric values (non-training) for data collected for a population. The metric model 245 uses the same features from any input population and collected data as the training set. These features are fed into the metric model 245 to determine a value of a metric.

Process for Selecting a Subset of Anomalies

The population determination module 270 may generate a large number of populations for purposes of analysis. As a result a large number of anomalies may be identified. However certain anomalies may be more significant to report compared to others. Accordingly, the online system 100 identifies anomalies that are likely to be more valuable for a user. For example, the online system 100 may identify several thousands of anomalies. The information describing the anomalies may be reviewed by a user. However reporting information based on all the identified anomalies may result in presenting excessive information that makes it difficult to analyze the information. Therefore, the online system 100 selects a subset of anomalies for further analysis.

Figure 7:
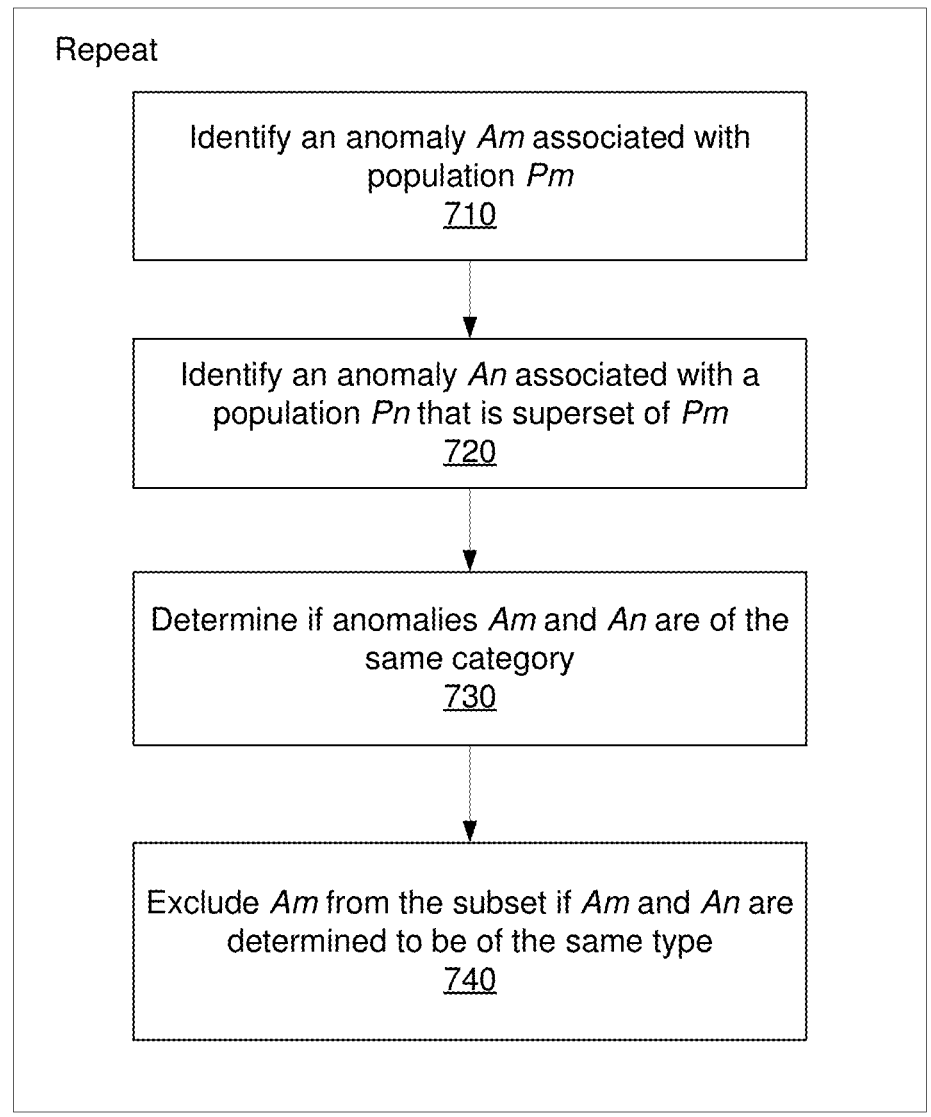
FIG. 7 shows a flowchart illustrating a process for pruning anomalies for generating alerts efficiently, in accordance with an embodiment of the invention.

FIG. 7 shows a flowchart illustrating a process for pruning anomalies for generating alerts efficiently, in accordance with an embodiment of the invention. The anomaly filtering module 215 analyzes the anomalies to prune several anomalies so that a subset of the identified anomalies is further analyzed. The anomaly filtering module 215 repeats the following steps (including 710, 720, 730, and 740). The anomaly filtering module 215 identifies a first anomaly associated with a first population, for example, anomaly Am associated with population Pm. The anomaly filtering module 215 identifies a second anomaly associated with a second population that is a superset of the first population, for example, anomaly An associated with population Pn such that population Pn is a superset of population Pm. For example, population Pn may be a department of an organization and Pm may be a team within that department.

The anomaly filtering module 215 determines whether the two anomalies are of the same type, for example, whether both anomalies Am and An are of the same type. If the anomaly filtering module 215 determines that the two anomalies are of the same type, the anomaly filtering module 215 excludes the first anomaly, i.e., anomaly Am from the subset being determined. The anomaly filtering module 215 repeats the above steps to exclude several anomalies. The remaining anomalies that were not excluded from the subset of the identified anomalies that are further analyzed.

Figure 8:
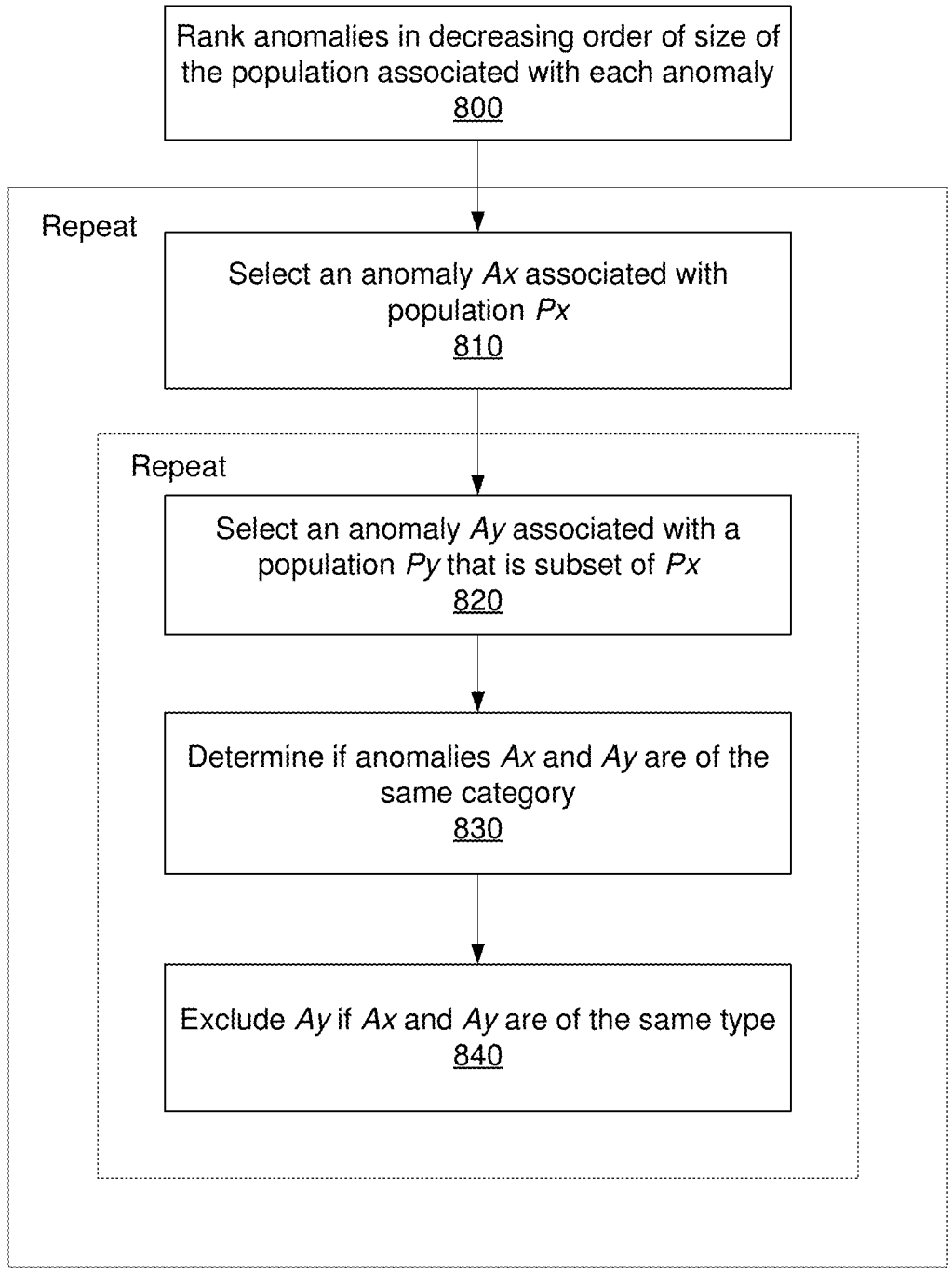
FIG. 8 shows a flowchart illustrating a process for pruning anomalies for generating alerts efficiently, in accordance with another embodiment of the invention.

FIG. 8 shows a flowchart illustrating a process for pruning anomalies in a given set of anomalies for generating alerts efficiently, in accordance with another embodiment of the invention. According to this embodiment, anomalies associated with larger populations are selected and all anomalies of the same types associated with smaller populations that are subsets of the larger population are excluded. The remaining anomalies are selected for further analysis.

The anomaly filtering module 215 ranks the anomalies in decreasing order of the sizes of populations associated with the anomalies so that anomalies associated with larger populations are processed first. The anomaly filtering module 215 repeats the following steps. The anomaly filtering module 215 selects an anomaly Ax associated with a population Px. For the selected anomaly Ax, the anomaly filtering module 215 repeats the following steps. The anomaly filtering module 215 selects another anomaly Py associated with population Py such that population Py is a subset of population Px. The anomaly filtering module 215 determines if the anomalies Ax and Ay are of the same type. If the anomalies Ax and Ay are of the same type, the anomaly filtering module 215 excludes the anomaly Ay from the subset of anomalies being determined. Accordingly, the anomaly filtering module 215 excludes a plurality of anomalies Ay associated with populations that are subsets of population Px before selecting the next anomaly Ax' associated with another population X'.

Ranking Anomalies Based on Relevance Scores

Figure 9:
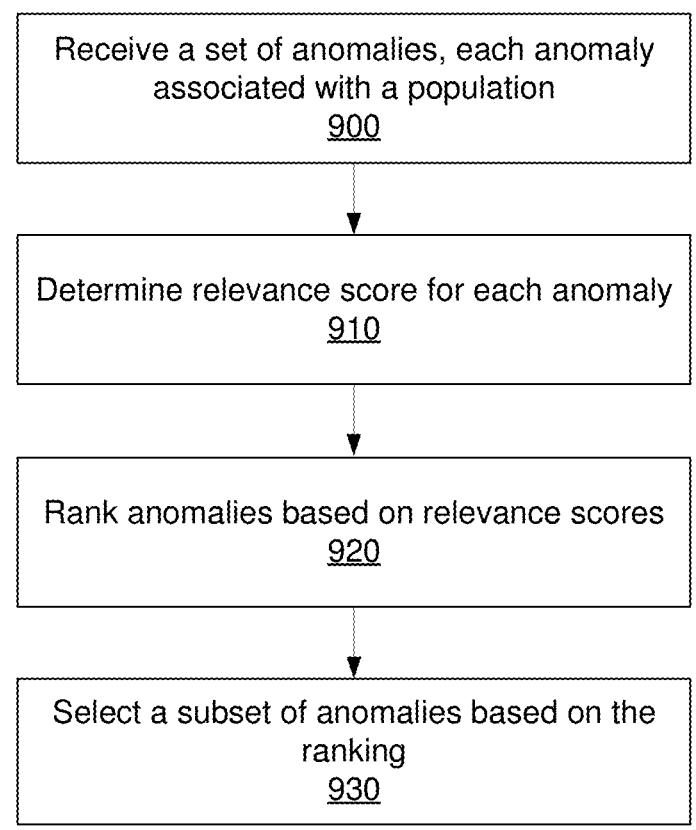
FIG. 9 shows a flowchart illustrating a process for ranking anomalies for generating alerts efficiently, in accordance with an embodiment of the invention.

FIG. 9 shows a flowchart illustrating a process for ranking anomalies for generating alerts efficiently, in accordance with an embodiment of the invention. The anomaly ranking module 220 receives 900 a set of anomalies, each anomaly associated with a population. The anomaly scoring module 295 determines relevance score for each anomaly. The anomaly scoring module 295 determines 910 the relevance score for an anomaly based on various factors associated with the anomaly. The anomaly ranking module 220 receives the relevance scores for the anomalies as generated by the anomaly scoring module 295. The anomaly ranking module 220 ranks 920 the anomalies based on the relevance scores. The anomaly ranking module 220 selects 930 a subset of the anomalies based on the ranking. For example, the anomaly ranking module 220 selects the top ranking anomalies from the received set of anomalies. In an embodiment, the alert generation module 140 generates alerts based on the selected subset of anomalies. The user interface manager 110 receives the generated alerts from the alert generation module 140 and sends for presentation via a user interface of a client application 125 for display via a client device 105.

The anomaly scoring module 295 determines relevance scores for anomalies based on various factors. These factors include: a category associated with an anomaly indicating whether the alert is about good information associated with the population or bad information, whether the anomaly is about a large population, for example, the entire company (e.g., an anomaly indicating a large deviation of collected data as compared to an industry benchmark), whether the alert is about a specific team (i.e., group of people reporting to a manager or supervisor), whether the alert is about overall response rate of users of the entire organization independent of specific attributes collected (for example, overall response rate for a survey rather than response for specific questions on the survey), or a measure of impact of an attribute associated with the anomaly, for example, an impact of the attribute on a likelihood of users of a population taking a particular action such as leaving the organization or an impact of the attribute on satisfaction of users. These attributes are described in further details as follows.

The anomaly scoring module 295 determines relevance score for an anomaly associated with a population based on a category associated with the anomaly. For example, a category indicating whether the anomaly corresponds to a positive news (or good news) or a negative news (or bad news) associated with the population. For example, certain user responses may be determined to be associated with a negative sentiment. Accordingly, an increase in an aggregate value based on these responses over time is determined by the system to be indicative of a negative news. In contrast, certain other user responses may be determined to be associated with a positive sentiment. Accordingly, an increase in an aggregate value based on these responses over time is determined by the system to be indicative of a positive news. In an embodiment, anomalies indicative of a negative news (or bad news) associated with a population is ranked higher compared to anomalies indicative of positive news. The system stores associations between types of anomalies and a score indicating whether the type of anomaly is positive or negative. In an embodiment, the system identifies an anomaly based on various features describing the anomaly, for example, the attributes associated with the anomaly, the type of computation performed to determine the anomaly, and so on. In another embodiment, each anomaly is associated with a set of instructions used to compute the anomaly. The system stores information identifying the sets of instructions corresponding to each anomaly and information indicating whether the anomaly is positive or negative. Accordingly, an alert indicating a negative news is more likely to be generated compared to an alert indicating a positive news.

In an embodiment anomaly scoring module 295 considers a size of the population associated with the anomaly as a factor for determining relevance score for the anomaly. Accordingly, the anomaly scoring module 295 ranks anomalies associated with larger populations higher than anomalies associated with smaller populations. For example, the anomaly scoring module 295 ranks an anomaly Am associated with a population Pm higher than an anomaly An associated with population Pn if size of population Pm is greater than the size of population Pn. As another example, the anomaly scoring module 295 ranks anomalies associated with the entire organization higher than anomalies associated with smaller groups of users within the organization. The anomaly associated with the entire organization may indicate that an aggregate value of an attribute based on the data collection differs from a corresponding industry benchmark by more than a threshold value.

In an embodiment, the anomaly scoring module 295 determines relevance score for an anomaly associated with a population based on a factor indicating whether the population corresponds to a predefined team of the organization. For example, the anomaly scoring module 295 ranks a population that corresponds to a predefined team higher than another population that does not corresponds to a team.

In an embodiment, the anomaly scoring module 295 determines relevance score for an anomaly based on whether the anomaly represents an overall response rate associated with the data collection independent of the attributes collected. For example, if the data collection is performed by presenting a survey to a set of users via a user interface and receiving responses from the users via the user interface, the overall response rate indicates a percentage (or a fraction) of the number of users that provided a response to at least one question in the survey with respect to the total number of users presented with the survey. The anomaly scoring module 295 ranks anomalies associated with an overall response rate higher than anomalies that are associated with specific attributes collected, for example, specific questions on the survey. For example, an anomaly indicating an increase in the overall response rate is ranked higher than an anomaly indicating that an aggregate value of a particular attribute received during a data collection changed by more than a threshold compared to a previous data collection.

In an embodiment, the anomaly scoring module 295 determines relevance score for an anomaly associated with an attribute based a measure of correlation between the attribute and an outcome attribute. An outcome attribute is an attribute that is predetermined to represent a particular result. The result may be indicative of a particular action taken by users of an organization, for example, whether a user is planning on leaving the organization or whether the user is not satisfied as a result of particular decision taken by the organization. Accordingly, if X indicates the outcome variable, the anomaly scoring module 295 determines correlations of other attributes with respect to attribute X based on previous collections of data. Accordingly, the anomaly scoring module 295 ranks an anomaly A1 higher than anomaly A2 if anomaly A1 is based on attribute P, attribute A2 is based on attribute Q and correlation between attribute P and attribute X is higher than correlation between attribute Q and attribute X.

In an embodiment, the anomaly scoring module 295 determines relevance score for an anomaly based on a measure of impact of the anomaly, wherein the anomaly is associated with a particular attribute score, for example, an aggregate value based on an attribute. The anomaly scoring module 295 determines the measure of impact of the anomaly as a function of the number of responses received during a data collection and a change in the attribute score compared to a baseline. The baseline may be a benchmark value associated with the attribute score or the value of the attribute score that was determined previously, for example, during a previous time interval during which data collection was performed. In an embodiment, the measure of impact of the anomaly is determined as a value obtained by multiplying the number of responses with $2q$, where q represents the attribute score change compared to the baseline.

In an embodiment, the anomaly scoring module 295 weighs the various factor in the following order (such that factors listed earlier are weighted higher): (1) a category associated with the anomaly indicating whether the alert is about good information associated with the population or bad information, (2) the size of the population associated with the anomaly, (3) factor indicating whether the anomaly is about a specific team (4) whether the anomaly is associated with the overall response rate of users of the entire organization (or a large population) independent of specific attributes collected (5) a measure of correlation between an attribute associated with the anomaly and an outcome attribute (6) a measure of impact of the attribute associated with the anomaly.

User Interfaces

The user interfaces illustrated in FIGS. 10-14 refer to an anomaly as an alert. These user interfaces illustrate one way to present information describing anomalies (or alerts) and receiving user interactions associated with anomalies. Other embodiments may present the information in other ways and allow users to perform other types of user interactions to analyze or view information describing a data collection.

Figure 10:
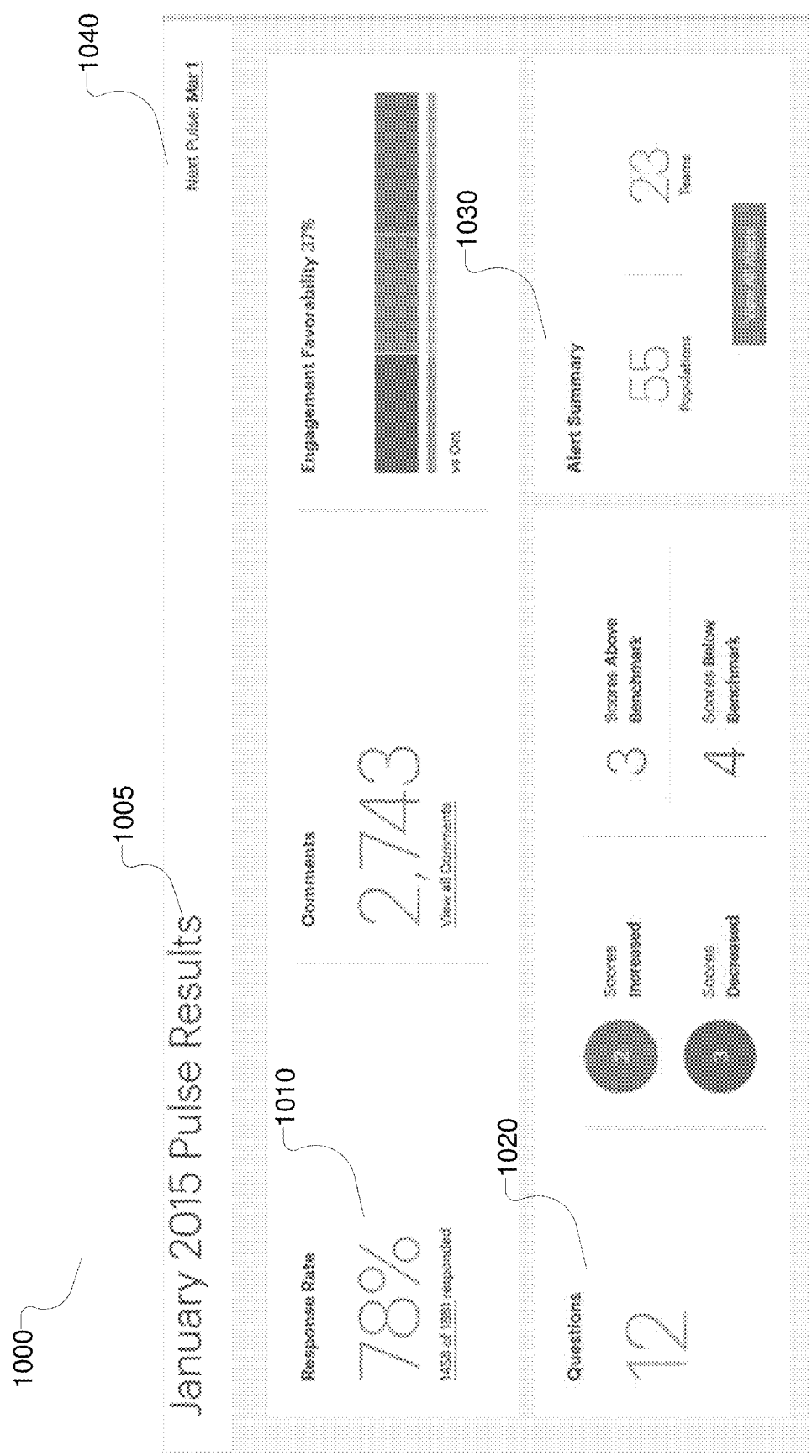
FIG. 10 illustrates an exemplary user interface representing a dashboard for presenting information describing a data collection, in accordance with an embodiment of the invention.

FIG. 10 illustrates an exemplary user interface 1000 representing a dashboard for presenting information describing a data collection, in accordance with an embodiment of the invention. The online system 100 performs data collection periodically and the user interface 1000 shows information describing the time of data collection for which information is currently being presented by the user interface 1000. As shown in FIG. 10, a pulse refers to an even of an organization when the users of the organization are presented with questions, for example, as part of a survey and requested to provide their responses the questions. The user interface 1000 shows text 1010 presenting information describing the overall response rate, for example, the number of users that responded responsive to being presented with the survey. The user interface 1000 presents a widget 1020 that shows the number of questions that were presented to the users. The user interface 1000 presents a widget 1030 that shows a summary of the alerts including the number of populations associated with a selected set of alerts and number of teams associated with the selected set of alerts. The widget 1030 is configured to receive a user input and present further information describing the alerts, for example, as shown in FIG. 11.

Figure 11:
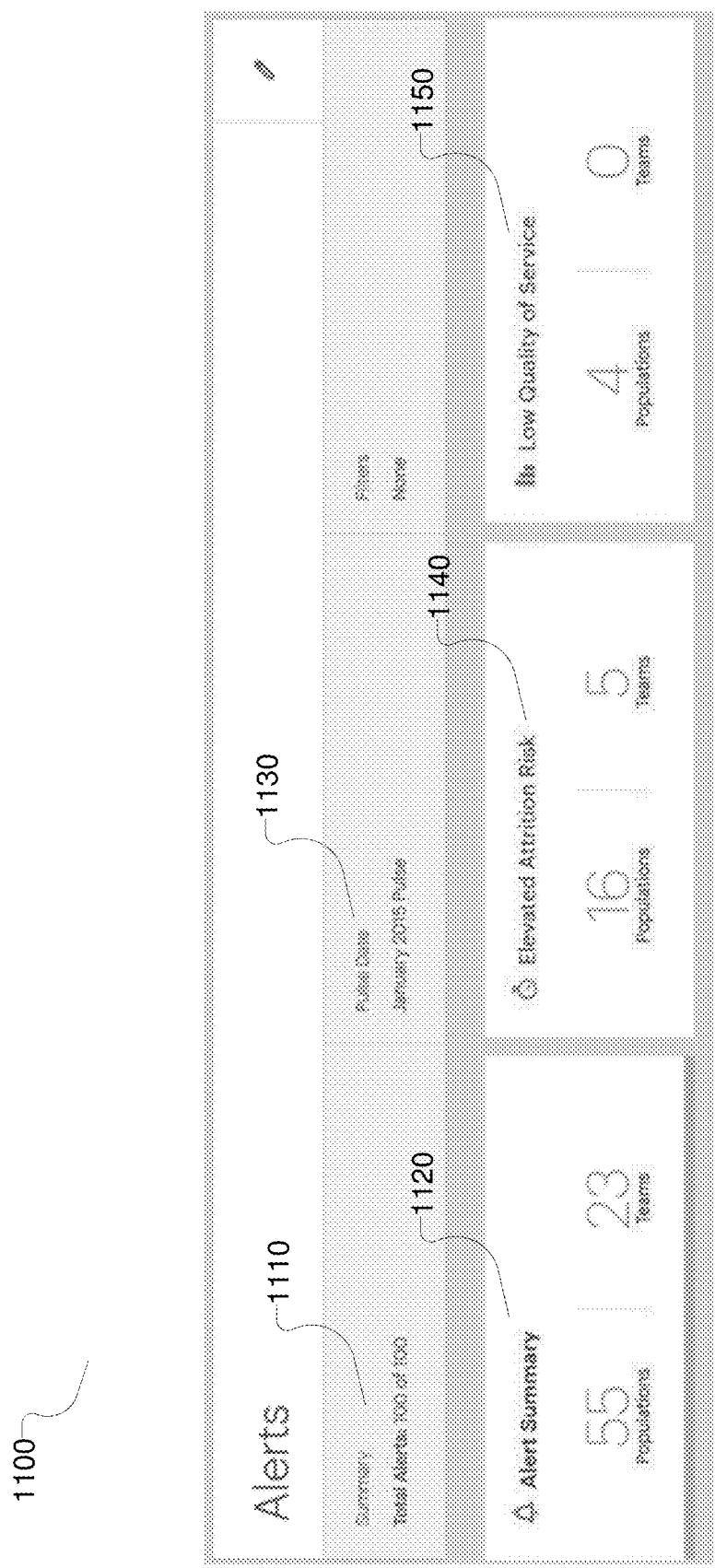
FIG. 11 illustrates an exemplary user interface for presenting a summary of alerts (or anomalies), in accordance with an embodiment of the invention.

FIG. 11 illustrates an exemplary user interface 1100 for presenting a summary of alerts (or anomalies), in accordance with an embodiment of the invention. The user interface 1100 shows information 1110 describing the number of alerts selected for further analysis. The user interface 1100 shows information 1120 describing the date when the data collection was performed. The user interface 1100 shows a widget 1120 that provides the summary of alerts including the number of populations associated with the selected alerts and the number of teams associated with the selected alerts. The user interface 1100 widgets 1140 and 1150 that select alerts of specific types, for example, widget 1140 shows summary of alerts that are associated with a predefined category of alerts indicating an elevated attrition risk and widget shows summary of alerts that are associated with a predefined category of alerts indicating a low quality of service by users belonging to the population.

Figure 12:
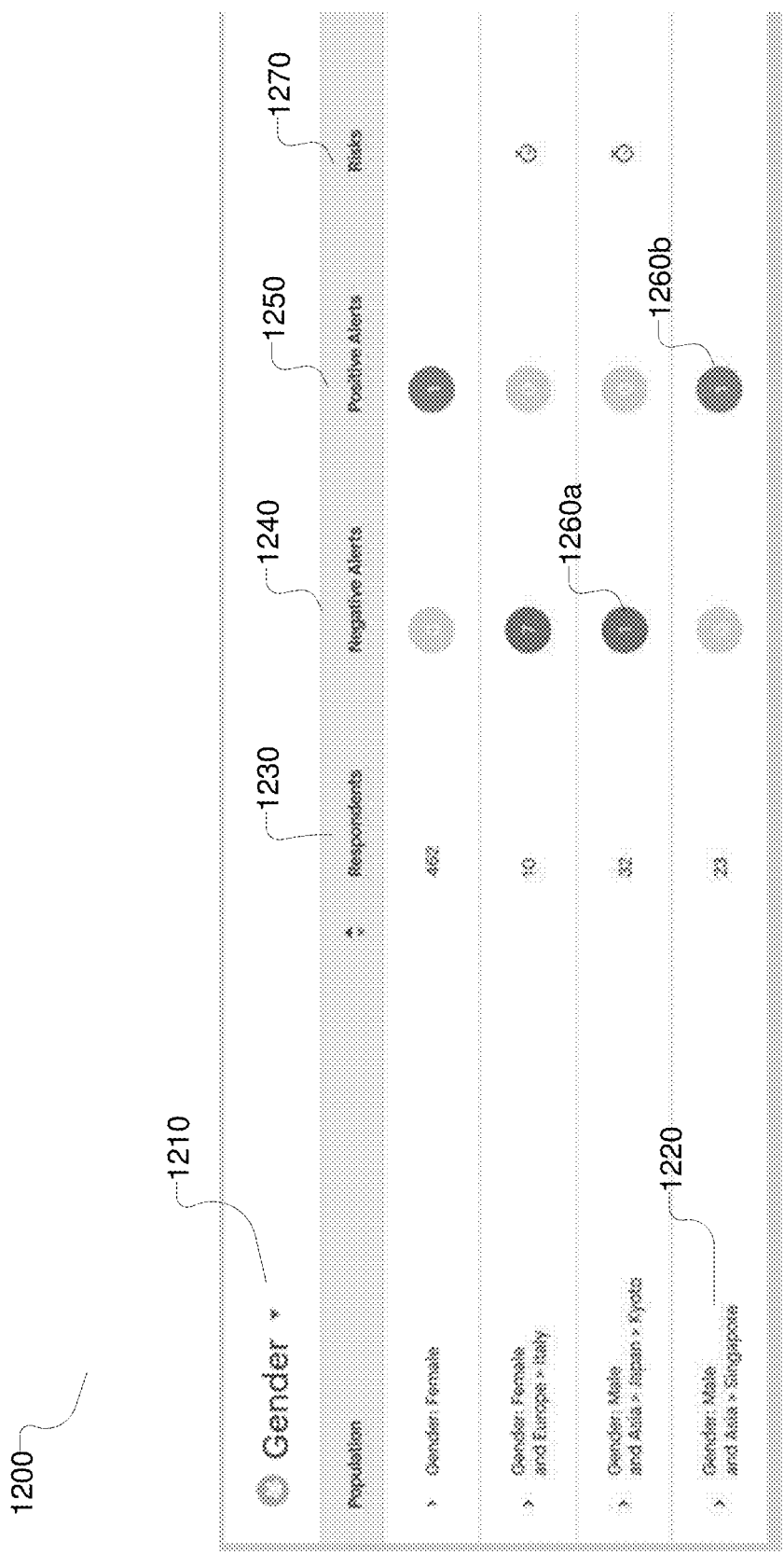
FIG. 12 illustrates an exemplary user interface presenting information describing alerts associated with a set of populations, in accordance with an embodiment of the invention.

FIG. 12 illustrates an exemplary user interface 1200 presenting information describing alerts associated with a set of populations, in accordance with an embodiment of the invention. The widget 1210 allows users to filter the sets of anomalies based on certain criteria, for example to view all anomalies associated with populations filtered based on a particular attribute such as gender, location, age, and so on. For a particular anomaly, the user interface 1200 presents information in tabular format, each row describing alerts for a population, and each column describing certain aspect of alerts associated with the population. The column 1230 shows the number of respondents, column 1240 shows the number of negative alerts (i.e., alerts categorized as indicating a negative news or information associated with a population), column 1250 shows the number of positive alerts 1240 (i.e., alerts categorized as indicating a positive news or information associated with a population), and column 1270 shows whether the alert is associated with a risk. The icons 1260 shows a summary of certain types of alerts as indicated by the row and column of the table and allow a user to view details of the alerts summarized by the icon.

Figure 13:
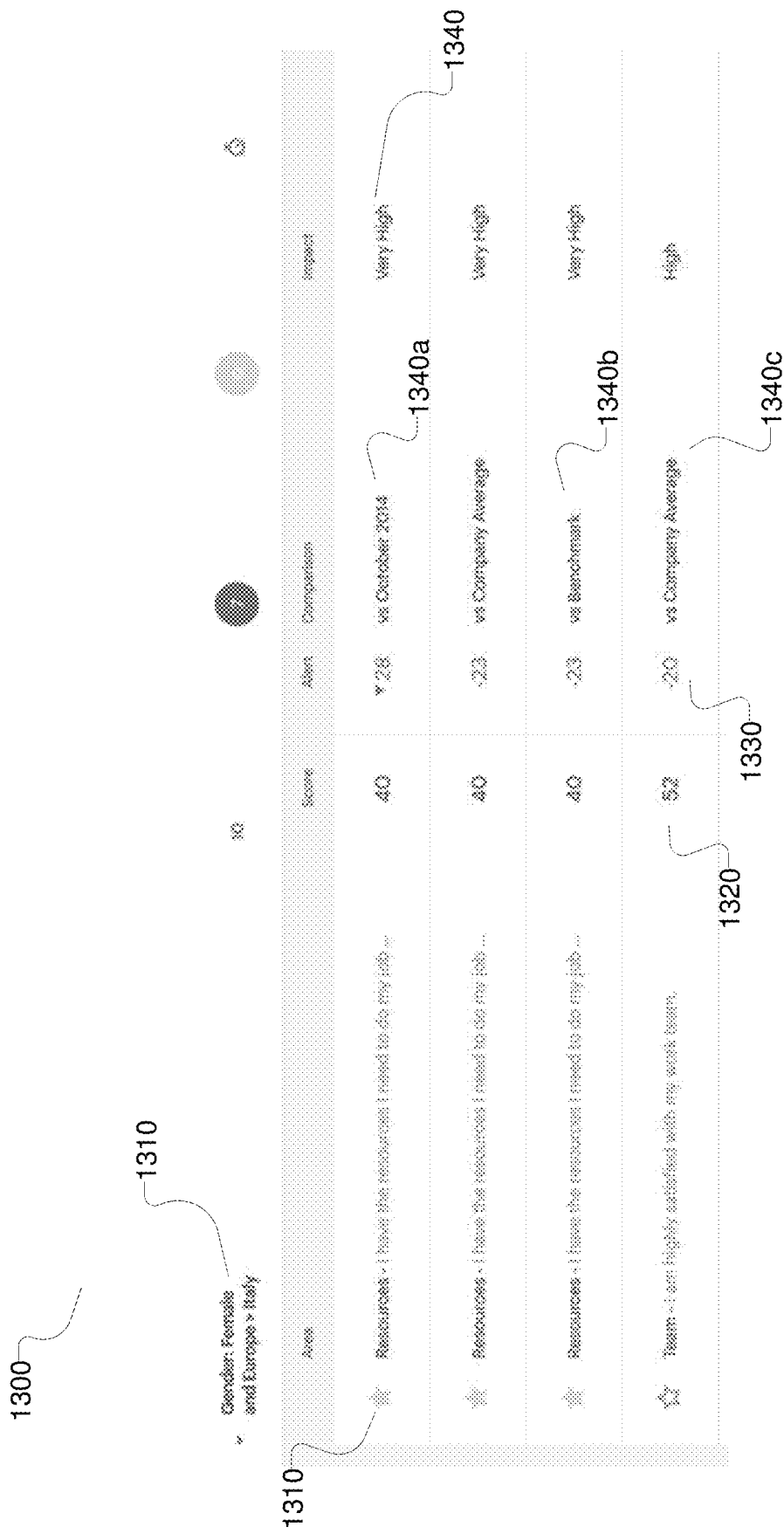
FIG. 13 illustrates an exemplary user interface presenting information describing a set of positive alerts, in accordance with an embodiment of the invention.

FIG. 13 illustrates an exemplary user interface 1300 presenting information describing a set of positive alerts, in accordance with an embodiment of the invention. The user interface 1300 shows the criteria or filter used to specify the population associated with the alerts. Each row shown in the user interface 1300 represents a type of alert. The user interface 1300 shows the description 1310 of each alert, a score 1320 associated with the alert, a different between the score 1320 of the alert and a baseline, for example, a benchmark or a corresponding score from a previous data collection. The user interface 1300 also shows a level of impact associated with the alert indicating whether the level of impact is high, very high, low, very low, and so on.

Figure 14:
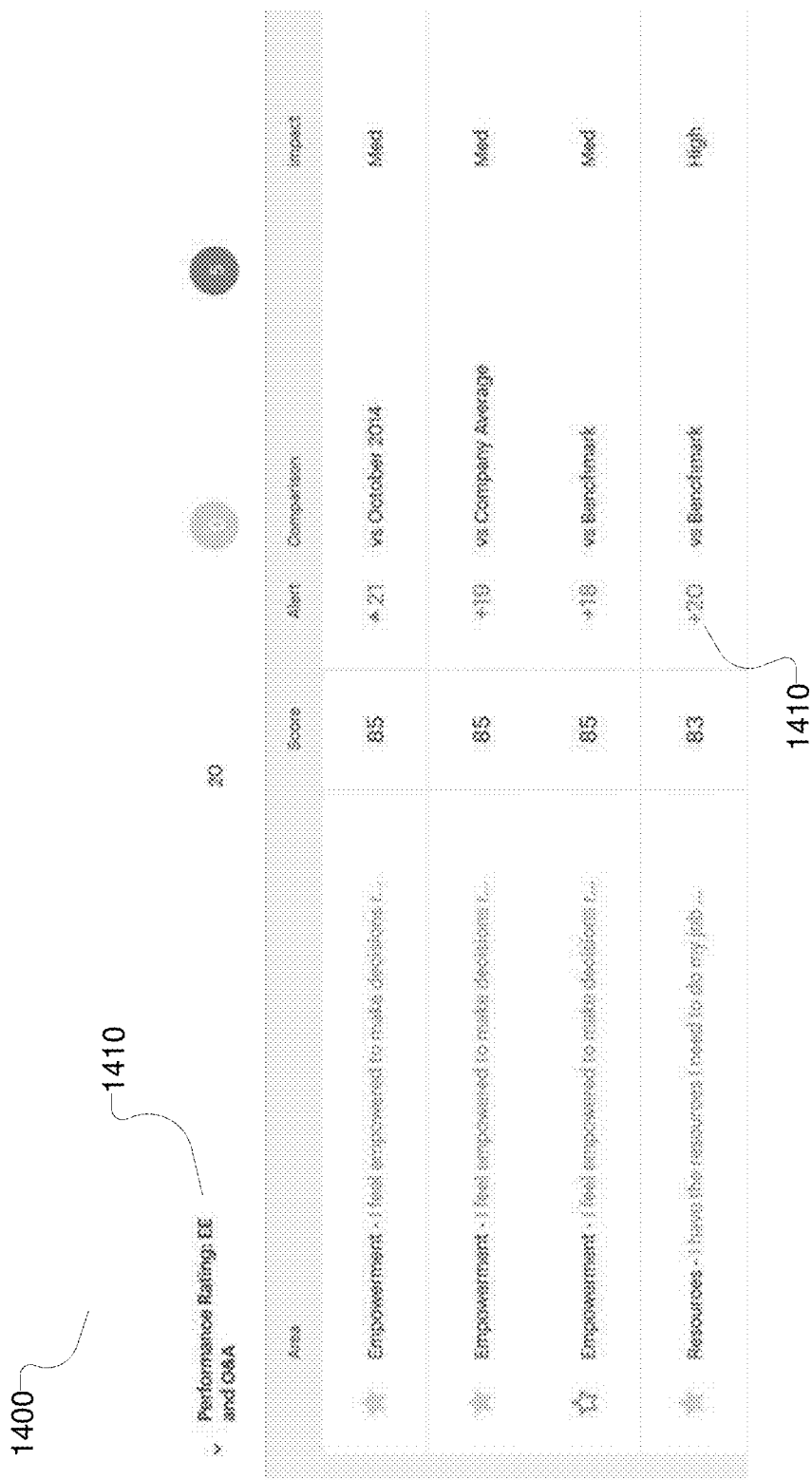
FIG. 14 illustrates an exemplary user interface presenting information describing a set of negative alerts, in accordance with an embodiment of the invention.

FIG. 14 illustrates an exemplary user interface presenting information describing a set of negative alerts, in accordance with an embodiment of the invention. The information displayed by the user interface shown in FIG. 14 is similar to the information shown in the user interface of FIG. 13 except that the alerts are positive and accordingly the change 1410 in score compared to a baseline is positive.

ALTERNATIVE APPLICATIONS

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

We claim:

1. A method for generating an alert, the method comprising:
   storing in a database, a plurality of records of a plurality of entities, each record storing one or more attributes describing an entity of the plurality of entities;
   performing data collection, the collected data representing responses associated with the plurality of entities;
   identifying a set of anomalies based on the collected data, wherein each anomaly in the set of anomalies is associated with multiple entities comprising a subset of the plurality of entities;
   for each anomaly in the set of anomalies, determining a relevance score for said each anomaly based on factors comprising information describing the subset of entities associated with said each anomaly, wherein the factors used for determining the relevance score for said each anomaly comprise a number of entities in the subset of entities associated with said each anomaly;
   ranking the set of anomalies based on the relevance score for each anomaly in the set of anomalies;
   determining a subset of the set of anomalies based on the ranking; and
   sending one or more alerts based on the subset of anomalies.

2. The method of claim 1, wherein a first anomaly associated with a first subset of entities is ranked higher than a second anomaly associated with a second subset of entities if the number of entities in the first subset entities is greater than the number of entities in the second subset of entities.

3. The method of claim 1, wherein the factors used for determining the relevance score for said each anomaly comprise a category of anomaly based on a type of information indicated by the anomaly, the type of information representing whether the anomaly indicates negative information associated with a population.

4. The method of claim 3, wherein a first anomaly associated with a first set of records is ranked higher than a second anomaly if the first anomaly is indicative of negative information associated with entities associated with the first set of records and the second anomaly is indicative of a positive information associated with the entities associated with the second set of records.

5. The method of claim 1, wherein the data collection received values for a set of collected attributes, the set of collected attribute comprising an outcome attribute, and an anomaly is associated with a collected attribute, wherein the factors used for determining the relevance score for the anomaly comprise a measure of correlation between the collected attribute and the outcome attribute.

6. The method of claim 5, wherein a first anomaly associated with a first collected attribute is ranked higher than a second anomaly associated with a second collected attribute if the first collected attribute is determined to have higher correlation with the outcome attribute compared to the second collected attribute.

7. The method of claim 1, wherein an entity represents a user and a record stores user profile attributes.

8. The method of claim 7, wherein performing data collection comprises presenting a set of questions to users via a user interface and receiving responses to the questions from the users.

9. The method of claim 1, wherein an anomaly is associated with a collected attribute and the factors used for determining the relevance score for the anomaly comprise a difference between an aggregate value of the collected attribute and a baseline value of the collected attribute.

10. The method of claim 9, wherein the baseline value of the collected attribute represents a benchmark.

11. The method of claim 9, wherein the baseline value of the collected attribute a previous aggregate value based on the collected attribute values obtained during a previous data collection.

12. The method of claim 1, wherein an anomaly based on an increase in an overall response rate associated with a data collection is ranked higher than an anomaly representing difference between values of a specific collected attribute and a baseline associated with the collected attribute.

13. The method of claim 1, further comprising:
   storing a machine-learned model that predicts a value of a particular metric describing a population based on input describing the population;
   for each anomaly in the set of anomalies:
      identifying a plurality of feature values associated with the multiple entities of said each anomaly;
      using the machine-learned model to generate a particular metric based on the plurality of features values.

14. A method comprising:
  storing in a database, a plurality of records of a plurality of entities, each record storing one or more attributes describing an entity of the plurality of entities;
  performing data collection, the collected data representing responses associated with the plurality of entities;
  identifying a set of anomalies based on the collected data, wherein each anomaly in the set of anomalies is associated with a set of users representing a population;
  for each anomaly in the set of anomalies, determining a relevance score for the anomaly;
  ranking the set of anomalies based on the relevance scores, wherein ranking the set of anomalies comprises:
    determining that a first anomaly is associated with a first population that corresponds to a pre-defined team;
    determining that a second anomaly is associated with a second population that does not correspond to any pre-defined team;
    ranking the first anomaly higher than the second anomaly at least based in part on the first population corresponding to the pre-define team and the second population not corresponding to any pre-defined team;
  determining a subset of anomalies based on the ranking; and
  sending one or more alerts based on the subset of anomalies.

15. A non-transitory computer-readable storage medium storing instructions which, when executed by one or more processors, cause:
  storing, in a database, a plurality of records of a plurality of entities, each record storing one or more attributes describing an entity of the plurality of entities;
  performing data collection, the collected data representing responses associated with the plurality of entities;
  identifying a set of anomalies based on the collected data, wherein each anomaly in the set of anomalies is associated with multiple entities comprising a subset of the plurality of entities;
  for each anomaly in the set of anomalies, determining a relevance score for said each anomaly based on factors comprising information describing the subset of entities associated with said each anomaly, wherein the factors used for determining the relevance score for said each anomaly comprise a number of entities in the subset of entities associated with said each anomaly;
  ranking the set of anomalies based on the relevance score for each anomaly in the set of anomalies;
  determining a subset of the set of anomalies based on the ranking; and
  sending one or more alerts based on the subset of anomalies.

16. The non-transitory computer-readable storage medium of claim 15, wherein the data collection received values for a set of collected attributes, the set of collected attribute comprising an outcome attribute, and an anomaly is associated with a collected attribute, wherein the factors used for determining the relevance score for the anomaly comprise a measure of correlation between the collected attribute and the outcome attribute.

17. The non-transitory computer-readable storage medium of claim 16, wherein a first anomaly associated with a first collected attribute is ranked higher than a second anomaly associated with a second collected attribute if the first collected attribute is determined to have higher correlation with the outcome attribute compared to the second collected attribute.

18. The non-transitory computer-readable storage medium of claim 15, wherein:
  the factors used for determining the relevance score for said each anomaly comprise a number of entities in the subset of entities associated with the anomaly;
  a first anomaly associated with a first subset of entities is ranked higher than a second anomaly associated with a second subset of entities if the number of entities in the first subset entities is greater than the number of entities in the second subset of entities.

19. The non-transitory computer-readable storage medium of claim 15, wherein:
  the factors used for determining the relevance score for said each anomaly comprise a category of anomaly based on a type of information indicated by the anomaly, the type of information representing whether the anomaly indicates negative information associated with a population;
  a first anomaly associated with a first subset of entities is ranked higher than a second anomaly associated with a second subset of entities if the first anomaly is indicative of negative information associated the first subset of entities and the second anomaly is indicative of a positive information associated with the second subset of entities.

20. The non-transitory computer-readable storage medium of claim 15, wherein the instructions, when executed by the one or more processors, further cause:
  storing a machine-learned model that predicts a value of a particular metric describing a population based on input describing the population;
  for each anomaly in the set of anomalies:
    identifying a plurality of feature values associated with the multiple entities of said each anomaly;
    using the machine-learned model to generate a particular metric based on the plurality of features values.

* * * * *

UNITED STATES PATENT AND TRADEMARK OFFICE
CERTIFICATE OF CORRECTION

PATENT NO. : 11,030,258 B1
APPLICATION NO. : 15/874811
DATED : June 8, 2021
INVENTOR(S) : Wen et al.

Page 1 of 1

It is certified that error appears in the above-identified patent and that said Letters Patent is hereby corrected as shown below:

In the Claims

In Column 22, Line 37, in Claim 19, after "associated", insert --with--

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*